United States Patent
Imada

(10) Patent No.: US 10,626,777 B2
(45) Date of Patent: Apr. 21, 2020

(54) EXHAUST PURIFICATION DEVICE AND VEHICLE

(71) Applicant: FUJITSU LIMITED, Kawasaki-shi, Kanagawa (JP)

(72) Inventor: Tadahiro Imada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 15/812,040

(22) Filed: Nov. 14, 2017

(65) Prior Publication Data
US 2018/0073414 A1 Mar. 15, 2018

Related U.S. Application Data

(63) Continuation of application No. PCT/JP2015/065070, filed on May 26, 2015.

(51) Int. Cl.
| | | |
|---|---|---|
| F01N 3/00 | (2006.01) | |
| F01N 9/00 | (2006.01) | |
| F01N 3/20 | (2006.01) | |
| F01N 3/027 | (2006.01) | |
| F01N 13/00 | (2010.01) | |
| F01N 3/021 | (2006.01) | |

(52) U.S. Cl.
CPC .......... *F01N 9/002* (2013.01); *F01N 3/021* (2013.01); *F01N 3/027* (2013.01); *F01N 3/0275* (2013.01); *F01N 3/20* (2013.01); *F01N 13/008* (2013.01); *F01N 2560/06* (2013.01); *F01N 2900/1602* (2013.01); *Y02T 10/47* (2013.01)

(58) Field of Classification Search
CPC .......... F01N 3/20; F01N 3/027; F01N 3/0275; F01N 9/002; F01N 3/021

USPC .......................................................... 60/295
See application file for complete search history.

(56) References Cited

U.S. PATENT DOCUMENTS

| | | | | |
|---|---|---|---|---|
| 2010/0040516 A1* | 2/2010 | Kimura | ................. | F01N 3/0892 422/186.29 |
| 2012/0003131 A1* | 1/2012 | Ibrahim | ............... | B01D 46/002 423/212 |

FOREIGN PATENT DOCUMENTS

| | | |
|---|---|---|
| JP | S57-097010 A | 6/1982 |
| JP | H05-202733 A | 8/1993 |
| JP | H08-193510 A | 7/1996 |
| JP | 2007-262973 A | 10/2007 |
| JP | 2010-024910 A | 2/2010 |
| JP | 2010-144630 A | 7/2010 |
| JP | 2011-163341 A | 8/2011 |

OTHER PUBLICATIONS

International Search Report for International Application No. PCT/JP2015/065070 dated Aug. 4, 2015.

* cited by examiner

*Primary Examiner* — Jason D Shanske
(74) *Attorney, Agent, or Firm* — Kratz, Quintos & Hanson, LLP

(57) ABSTRACT

An exhaust purification device includes: an exhaust pipe configured to discharge exhaust gas from an internal combustion engine; a filter provided in the exhaust pipe and configured to collect a particulate matter contained in the exhaust gas; a plurality of electrodes configured to apply electric fields to a plurality of regions of the filter, respectively; and a power supply configured to apply at least two AC signals mutually different in phase to the plurality of electrodes.

6 Claims, 10 Drawing Sheets

F I G. 6
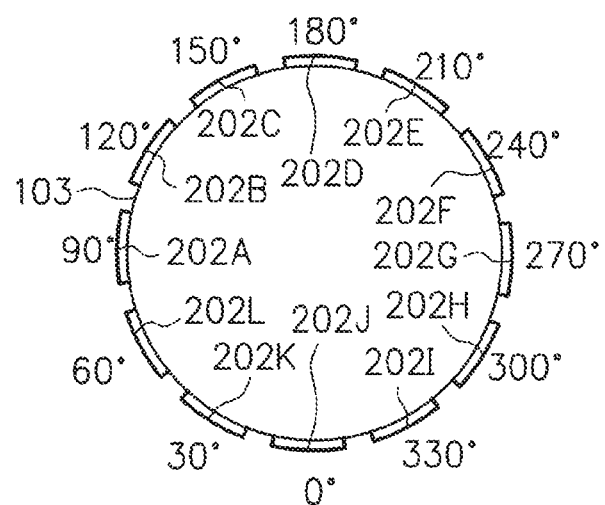

F I G. 10
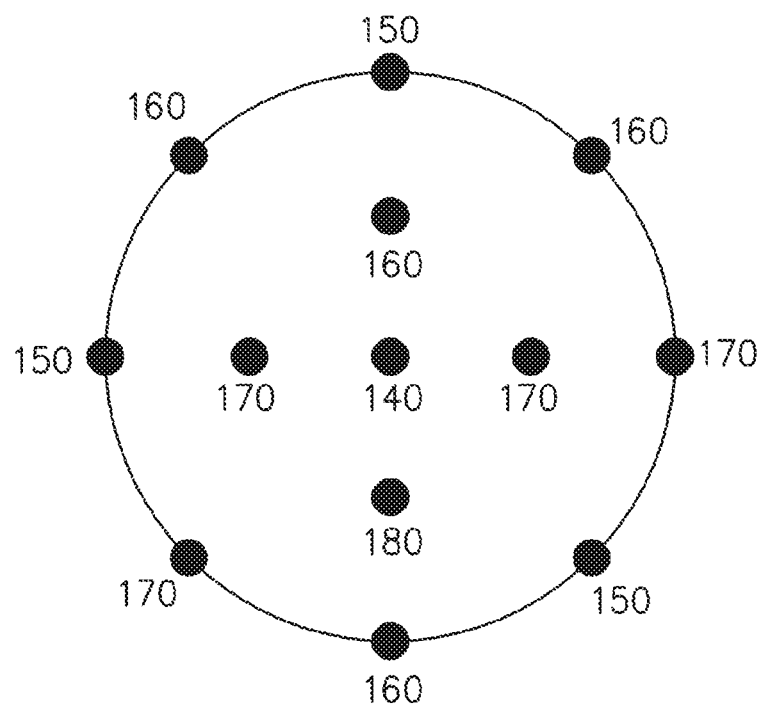
F I G. 11
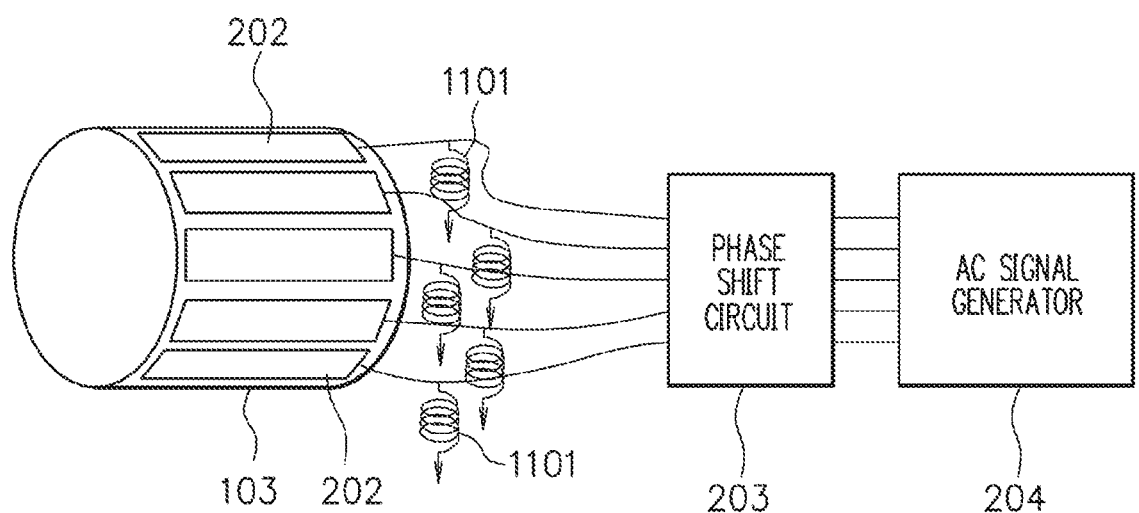

F I G. 15
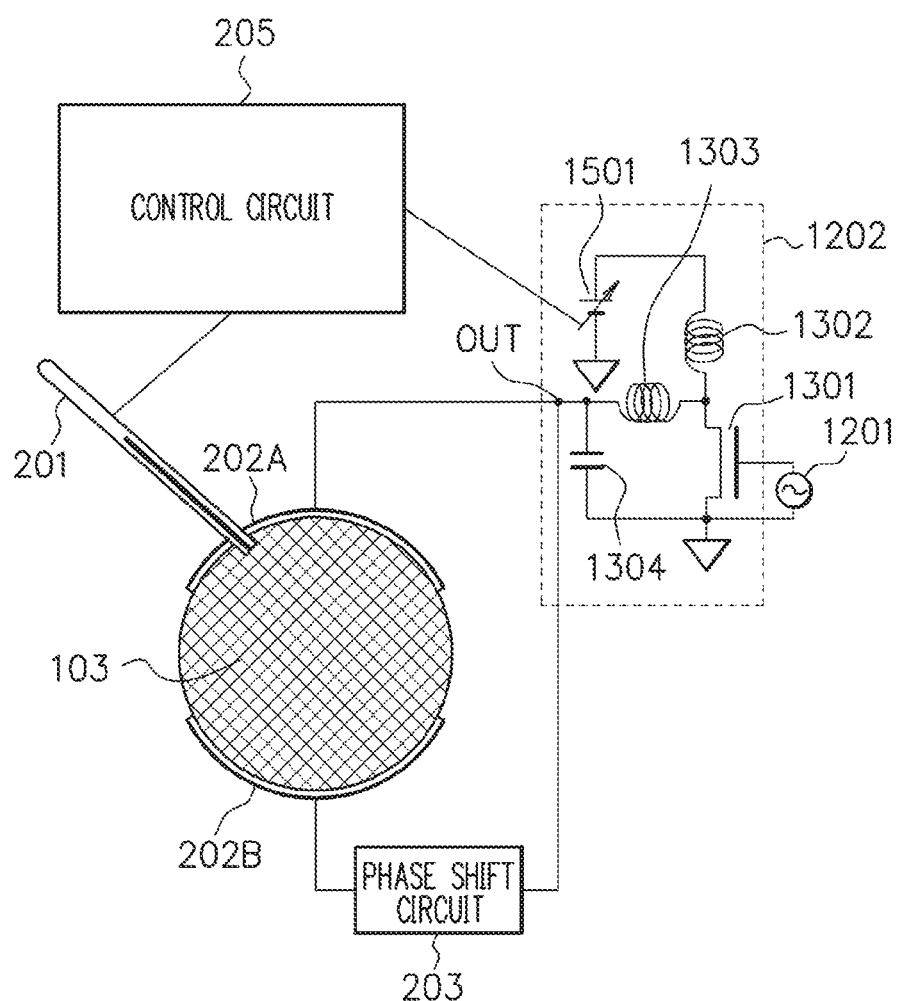

EXHAUST PURIFICATION DEVICE AND VEHICLE

CROSS-REFERENCE TO RELATED APPLICATION

This application is a continuation application of International Application PCT/JP2015/065070 filed on May 26, 2015 and designated the U.S., the entire contents of which are incorporated herein by reference.

FIELD

The embodiments discussed herein are directed to an exhaust purification device and a vehicle.

BACKGROUND

An exhaust purification device is known which includes an exhaust pipe member that forms an exhaust path through which exhaust from an internal combustion engine flows, and a particulate matter collection part that is provided in the exhaust path formed by the exhaust pipe member and collects a particulate matter contained in the exhaust (refer to Patent Document 1). A high-frequency irradiation part irradiates the particulate matter collection part with high-frequency waves. Movable reflection parts are provided on the upstream side and the downstream side, respectively, across the particulate matter collection part in a direction of flow of the exhaust in the exhaust path. Further, the movable reflection parts reflect the high-frequency waves radiated from the high-frequency irradiation part toward the particulate matter collection part, and at least one of the movable reflection parts on the upstream side and the downstream side has a reflection surface which reflects the high-frequency waves to the particulate matter collecting part and is movable with respect to the particulate matter collection part.

Besides, an internal combustion engine filter regenerative apparatus is known which includes an exhaust pipe that discharges exhaust gas from an internal combustion engine and a filter that is housed in the exhaust pipe and collects particulates contained in the exhaust gas (refer to Patent Document 2). A filter regenerator heats and burns the particulates. A temperature detector detects the temperature of the filter. A control unit controls the operation time of the filter regenerator on the basis of a signal from the temperature detector.

Patent Document 1: Japanese Laid-open Patent Publication No. 2011-163341
Patent Document 2: Japanese Laid-open Patent Publication No. H5-202733

There is a problem in irradiating the particulate matter collection part with high-frequency waves, in which unevenness occurs in a temperature distribution in the particulate matter collection part to make it difficult to uniformly remove the particulate matter in the particulate matter collection part, thereby failing to remove the particulate matter in a region at low temperature. Further, a local temperature rise may melt and break a part of the particulate matter collection part.

SUMMARY

An exhaust purification device includes: an exhaust pipe configured to discharge exhaust gas from an internal combustion engine; a filter provided in the exhaust pipe and configured to collect a particulate matter contained in the exhaust gas; a plurality of electrodes configured to apply electric fields to a plurality of regions of the filter, respectively; and a power supply configured to apply at least two AC signals mutually different in phase to the plurality of electrodes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a view illustrating the phases of the AC signals applied to the 12 electrodes, respectively, in the case of $\omega t=90°$;
FIG. 10 is a view illustrating a temperature distribution in the filter according to a first embodiment;
FIG. 11 is a diagram illustrating a configuration example of an exhaust purification device according to a second embodiment;
FIG. 15 is a diagram illustrating a configuration example of an exhaust purification device according to a fifth embodiment.

DESCRIPTION OF EMBODIMENTS

First Embodiment

Figure 1:
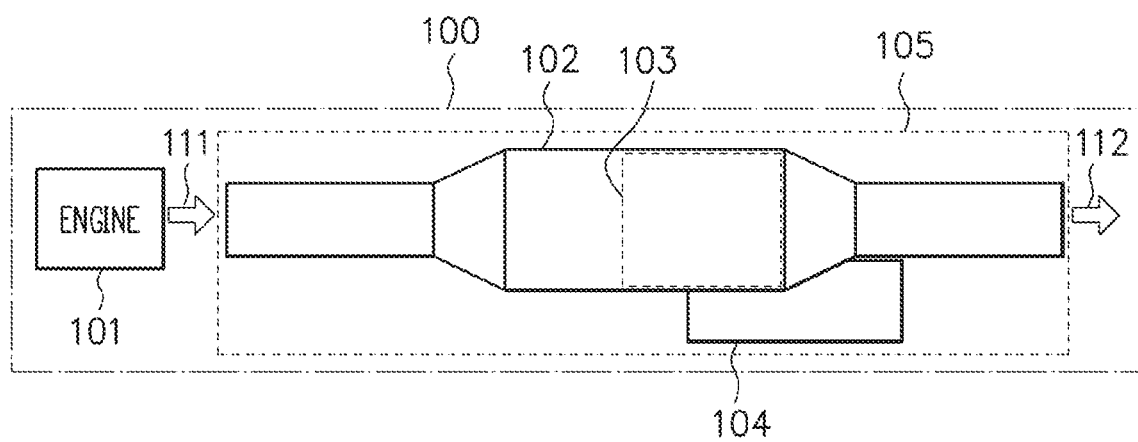
FIG. 1 is a diagram illustrating a configuration example of a vehicle according to a first embodiment.

FIG. 1 is a diagram illustrating a configuration example of a vehicle 100 according to a first embodiment. The vehicle 100 is a two-wheeled automobile, a three-wheeled automobile, a four-wheeled automobile or the like, and includes an engine 101 and an exhaust purification device 105. The exhaust purification device 105 includes an exhaust pipe 102, a filter 103, and a power supply 104. The engine 101 is an internal combustion engine such as a diesel engine or a gasoline engine, and discharges exhaust gas 111. In particular, it is enhanced to reduce and restrict a particulate matter (PM) in the exhaust gas discharged from the diesel vehicle 100 including the diesel engine 101. The engine 101 discharges the exhaust gas 111 containing the particulate matter. The exhaust pipe 102 takes in the exhaust gas 111 from the engine 101. The filter 103 is provided in the exhaust pipe 102 and collects the particulate matter contained in the exhaust gas 111. The exhaust pipe 102 discharges exhaust gas 112 from which the particulate matter has been removed.

The particulate matter collecting ability of the filter 103 is finite. When the filter 103 continues to collect the particulate matter, clogging of the filter 103 occurs to make the flow of the exhaust gas in the exhaust pipe 102 becomes worse, resulting in output deterioration or stop of the engine 101. The power supply 104 applies a high-frequency AC signal to a plurality of electrodes around the filter 103. Then, an electric field occurring in the filter 103 changes at a high frequency, so that the filter 103 generates heat. This makes it possible to remove the particulate matter in the filter 103 by incineration (oxidative decomposition) and thereby clean the filter 103.

Figure 2:
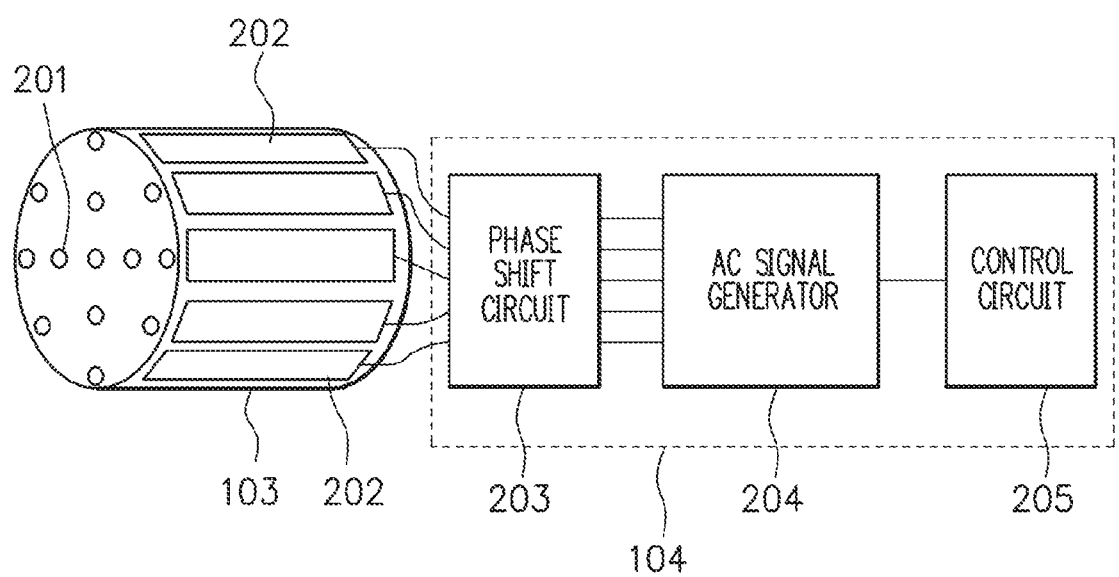
FIG. 2 is a diagram illustrating a configuration example of a filter and a power supply in FIG. 1.

FIG. 2 is a diagram illustrating a configuration example of the filter 103 and the power supply 104 in FIG. 1. The filter 103 is, for example, a diesel particulate filter (DPF) and collects the particulate matter in the exhaust gas 111 from the engine 101. The filter 103 is formed of porous ceramic and collects the particulate matter. The filter 103 is provided with a plurality of temperature detectors 201 each of which detects the temperature of each region in the filter 103. The temperature detector 201 is, for example, an optical fiber temperature sensor. A plurality of electrodes 202 are provided around the filter 103 and can apply electric fields to a plurality of regions of the filter 103, respectively.

The power supply 104 includes a phase shift circuit 203, an AC signal generator 204, and a control circuit 205, and applies AC signals mutually different in phase to the plurality of electrodes 202. The AC signal generator 204 generates an AC signal at 200 MHz to 10 GHz and outputs the generated AC signal to the phase shift circuit 203. The phase shift circuit 203 retards the AC signal by different delay times to generate a plurality of AC signals mutually different in phase, and applies the plurality of generated AC signals to the plurality of electrodes 202, respectively. The control circuit 205 controls the AC signal generator 204 according to the temperatures detected by the plurality of temperature detectors 201.

Figure 3:
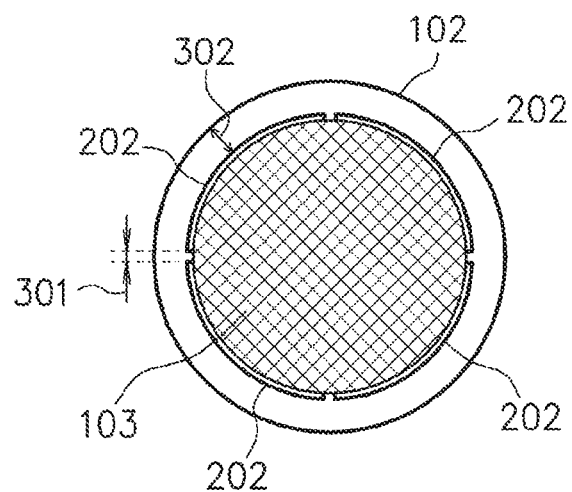
FIG. 3 is a cross-sectional view illustrating a configuration example of an exhaust pipe, a filter, and a plurality of electrodes in FIG. 2.

FIG. 3 is a cross-sectional view illustrating a configuration example of the exhaust pipe 102, the filter 103, and the plurality of electrodes 202 in FIG. 2. The plurality of electrodes 202 are provided around the filter 103, and the AC signals mutually different in phase are applied to them. As a result, different potentials are applied to the plurality of electrodes 202 to cause electric fields in the filter 103. Since the AC signals are at high frequencies of 200 MHz to 10 GHz, the electric fields in the filter 103 change at high frequencies, so that the filter 103 generates heat and thereby can remove the particulate matter in the filter 103.

Here, the exhaust pipe 102 is, for example, at a ground potential. If an interval 301 between the plurality of electrodes 202 is larger than an interval 302 between each of the plurality of electrodes 202 and the exhaust pipe 102, electric fields occur between the plurality of electrodes 202 and the exhaust pipe 102 to weaken the electric fields in the filter 103. In order to cause strong electric fields in the filter 103, the interval 301 between the plurality of electrodes 202 needs to be made smaller than the interval 302 between each of the plurality of electrodes 202 and the exhaust pipe 102.

Figure 4:
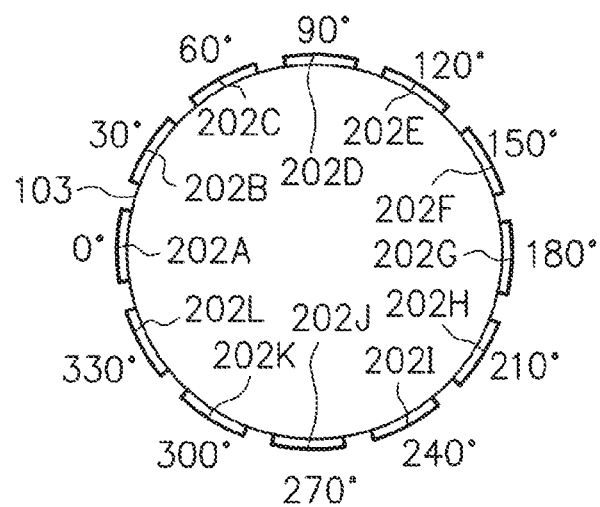
FIG. 4 is a view illustrating the phases of AC signals applied to 12 electrodes, respectively.

FIG. 4 is a view illustrating the phases of the AC signals applied to 12 electrodes 202A to 202L, respectively. The 12 electrodes 202A to 202L correspond to the plurality of electrodes 202 in FIG. 2 and are provided around the filter 103. To the 12 electrodes 202A to 202L, AC signals mutually same in frequency and shifted in phase by 30° are applied, respectively. To the electrode 202A, an AC signal of Vo×sin (ωt+0°) is applied. To the electrode 202B, an AC signal of Vo×sin (ωt+30°) is applied. To the electrode 202C, an AC signal of Vo×sin (ωt+60°) is applied. To the electrode 202D, an AC signal of Vo×sin (ωt+90°) is applied. To the electrode 202E, an AC signal of Vo×sin (ωt+120°) is applied. To the electrode 202F, an AC signal of Vo×sin (ωt+150°) is applied. To the electrode 202G, an AC signal of Vo×sin (ωt+180°) is applied. To the electrode 202H, an AC signal of Vo×sin (ωt+210°) is applied. To the electrode 202I, an AC signal of Vo×sin (ωt+240°) is applied. To the electrode 202J, an AC signal of Vo×sin (ωt+270°) is applied. To the electrode 202K, an AC signal of Vo×sin (ωt+300°) is applied. To the electrode 202L, an AC signal of Vo×sin (ωt+330°) is applied.

Figure 5:
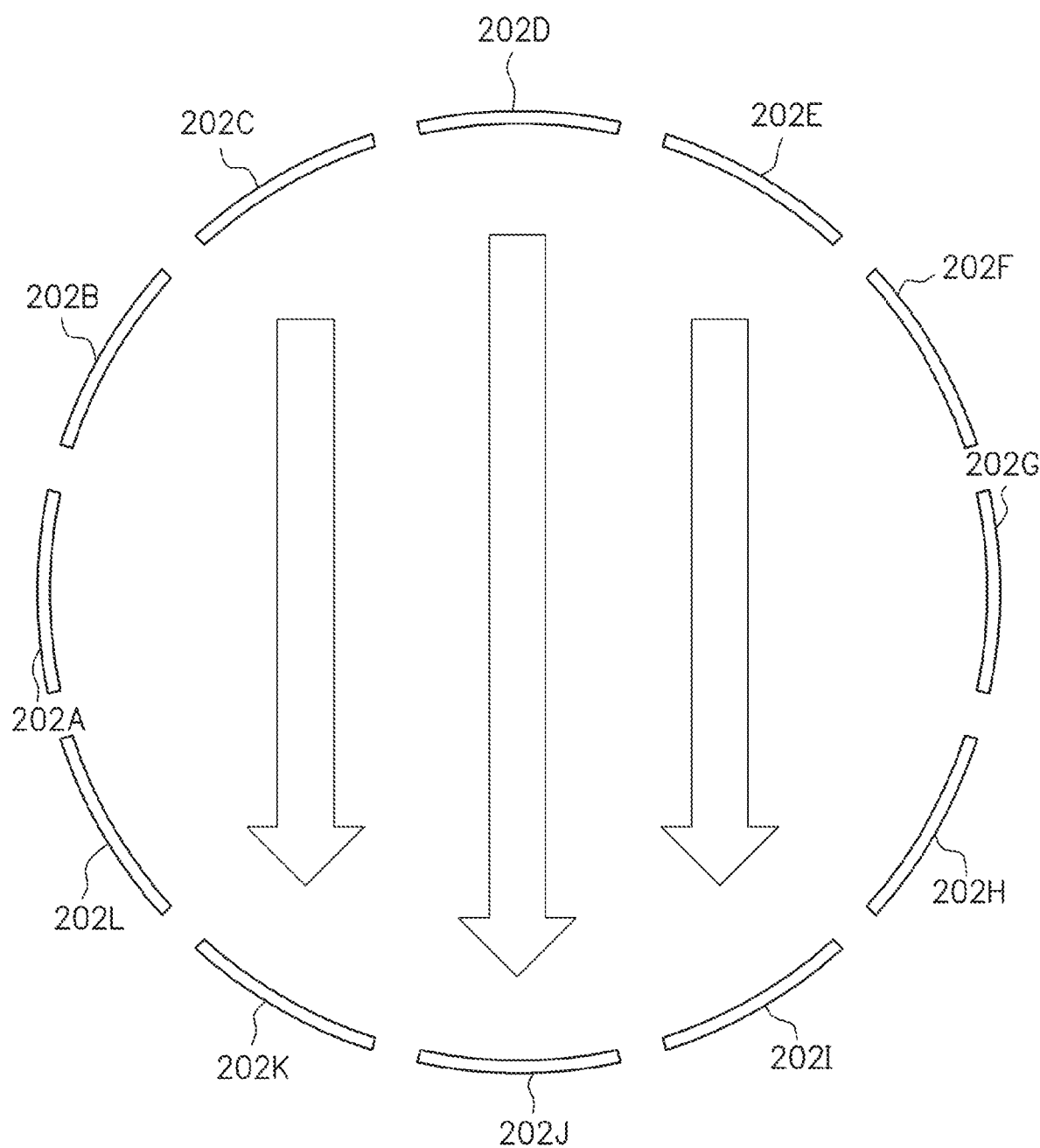
FIG. 5 is a view illustrating an electric field distribution in the filter in the case of $\omega t=0°$.

FIG. 4 illustrates the phases in the case of ωt=0°, and FIG. 5 illustrates an electric field distribution in the filter 103 in the case of ωt=0°. Hereinafter, the case of ωt=0° will be described. To the electrode 202A, a potential of Vo×sin 0°=Vo×0 [V] is applied. To the electrode 202B, a potential of Vo×sin 30°=Vo×0.5 [V] is applied. To the electrode 202C, a potential of Vo×sin 60°≈Vo×0.866 [V] is applied. To the electrode 202D, a potential of Vo×sin 90°=Vo×1 [V] is applied. To the electrode 202E, a potential of Vo×sin 120°≈Vo×0.866 [V] is applied. To the electrode 202F, a potential of Vo×sin 150°=Vo×0.5 [V] is applied. To the electrode 202G, a potential of Vo×sin 180°=Vo×0 [V] is applied. To the electrode 202H, a potential of Vo×sin 210°=Vo×(−0.5) [V] is applied. To the electrode 202I, a potential of Vo×sin 240°≈Vo×(−0.8666) [V] is applied. To the electrode 202J, a potential of Vo×sin 270°=Vo×(−1) [V] is applied. To the electrode 202K, a potential of Vo×sin 300°≈Vo×(−0.866) [V] is applied. To the electrode 202L, a potential of Vo×sin 330°=Vo×(−0.5) [V] is applied. As a result, electric fields in a direction from top to down in FIG. 5 occur in the filter 103.

FIG. 6 is a view illustrating the phases of the AC signals applied to the 12 electrodes 202A to 202L, respectively, in the case of ωt=90°. To the electrode 202A, a potential of Vo×sin (90°+0°)=Vo×sin 90°=Vo×1 [V] is applied. To the electrode 202B, a potential of Vo×sin (90°+30°)=Vo×sin 120°≈Vo×0.866 [V] is applied. To the electrode 202C, a potential of Vo×sin (90°+60°)=Vo×sin 150°=Vo×0.5 [V] is applied. To the electrode 202D, a potential of Vo×sin (90°+90°)=Vo×sin 180°=Vo×0 [V] is applied. To the electrode 202E, a potential of Vo×sin (90°+120°)=Vo×sin 210°=Vo×(−0.5) [V] is applied. To the electrode 202F, a potential of Vo×sin (90°+150°)=Vo×sin 240°≈Vo×(−0.866) [V] is applied. To the electrode 202G, a potential of Vo×sin (90°+180°)=Vo×sin 270°=Vo×(−1) [V] is applied. To the electrode 202H, a potential of Vo×sin (90°+210°)=Vo×sin 300°≈Vo×(−0.866) [V] is applied. To the electrode 202I, a potential of Vo×sin (90°+240°)=Vo×sin 330°=Vo×0.5) [V] is applied. To the electrode 202J, a potential of Vo×sin (90°+270°)=Vo×sin 0° Vo×0 [V] is applied. To the electrode 202K, a potential of Vo×sin (90°+300°)=Vo×sin 30°=Vo×0.5 [V] is applied. To the electrode 202L, a potential of Vo×sin (90°+330°)=Vo×sin 60°≈Vo×−0.866 [V] is applied. In this case, electric fields obtained by making a leftward quarter turn of the electric fields in FIG. 5 occur in the filter 103.

In the case of ωt=180°, electric fields obtained by making a leftward half turn of the electric fields in FIG. 5 similarly occur in the filter 103. Besides, in the case of ωt=270°, electric fields obtained by making a leftward three-quarter turn of the electric fields in FIG. 5 occur in the filter 103. As described above, the electric fields in FIG. 5 makes one leftward turn in one cycle of the AC signal with time. The electric fields occurring in the filter 103 change at high frequency as described above, so that heat is uniformly generated in the filter 103 and can uniformly remove the particulate matter in the filter 103.

Figure 7:
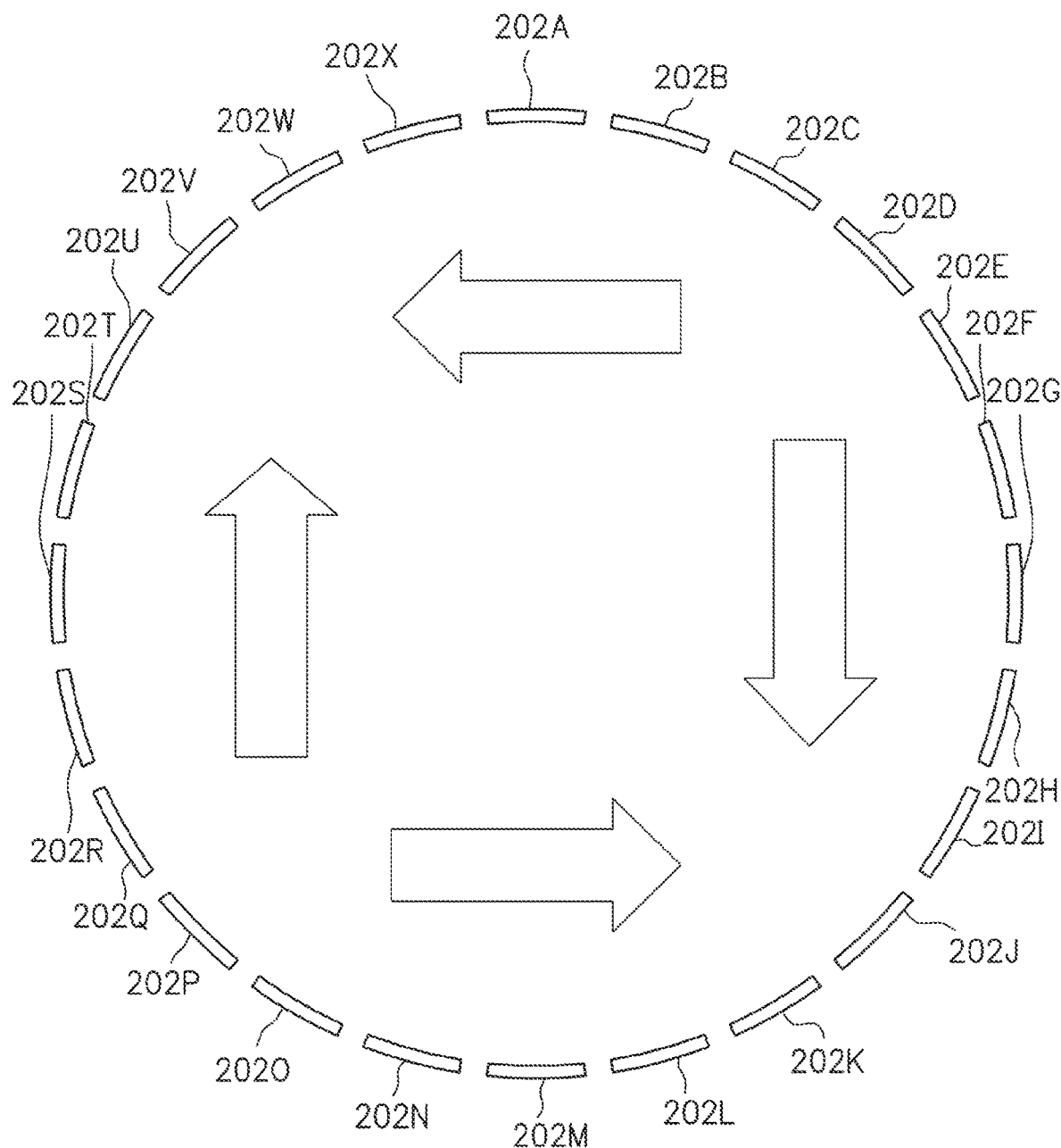
FIG. 7 is a view illustrating an electric field distribution in the case where 24 electrodes are provided around the filter.

FIG. 7 is a view illustrating an electric field distribution in the case where 24 electrodes 202A to 202X are provided around the filter 103. To the electrodes 202A and 202M, an AC signal of Vo×sin (ωt+0°) is applied. To the electrodes 202B and 202N, an AC signal of Vo×sin (ωt+30°) is applied. To the electrodes 202C and 202O, an AC signal of Vo×sin (ωt+60°) is applied. To the electrodes 202D and 202P, an AC signal of Vo×sin (ωt+90°) is applied. To the electrodes 202E and 202Q, an AC signal of Vo×sin (ωt+120°) is applied. To the electrodes 202F and 202R, an AC signal of Vo×sin (ωt+150°) is applied. To the electrodes 202G and 202S, an AC signal of Vo×sin (ωt+180°) is applied. To the electrodes 202H and 202T, an AC signal of Vo×sin (ωt+210°) is applied. To the electrodes 202I and 202U, an AC signal of Vo×sin (ωt+240°) is applied. To the electrodes 202J and 202V, an AC signal of Vo×sin (ωt+270°) is applied. To the electrodes 202K and 202W, an AC signal of Vo×sin (ωt+300°) is applied. To the electrodes 202L and 202X, an AC signal of Vo×sin (ωt+330°) is applied.

FIG. 7 illustrates an electric field distribution in the filter 103 in the case of ωt=0°. To the electrodes 202A and 202M, a potential of Vo×sin 0°=Vo×0 [V] is applied. To the electrodes 202B and 202N, a potential of Vo×sin 30°=Vo× 0.5 [V] is applied. To the electrodes 202C and 202O, a potential of Vo×sin 60°=Vo×0.866 [V] is applied. To the electrodes 202D and 202P, a potential of Vo×sin 90°=Vo×1 [V] is applied. To the electrodes 202E and 202Q, a potential of Vo×sin 120°≈Vo×0.866 [V] is applied. To the electrodes 202F and 202R, a potential of Vo×sin 150°=Vo×0.5 [V] is applied. To the electrodes 202G and 202S, a potential of Vo×sin 180°=Vo×0 [V] is applied. To the electrodes 202H and 202T, a potential of Vo×sin 210°=Vo×(−0.5) [V] is applied. To the electrodes 202I and 202U, a potential of Vo×sin 240°≈Vo×(−0.8666) [V] is applied. To the electrodes 202J and 202V, a potential of Vo×sin 270°=Vo×(−1) [V] is applied. To the electrodes 202K and 202W, a potential of Vo×sin 300°≈Vo×(−0.866) [V] is applied. To the electrodes 202L and 202X, a potential of Vo×sin 330°=Vo×(−0.5) [V] is applied.

As a result, an electric field in a direction from the upper right to the lower right, an electric field in a direction from the upper right to the upper left, an electric field in a direction from the lower left to the upper left, and an electric field in a direction from the lower left to the lower right in FIG. 7 occur in the filter 103. The electric field distribution in FIG. 7 makes one leftward turn in two cycles of the AC signal with time. The electric fields occurring in the filter 103 change at high frequency, so that heat is uniformly generated in the filter 103 and can uniformly remove the particulate matter in the filter 103.

Figure 8:
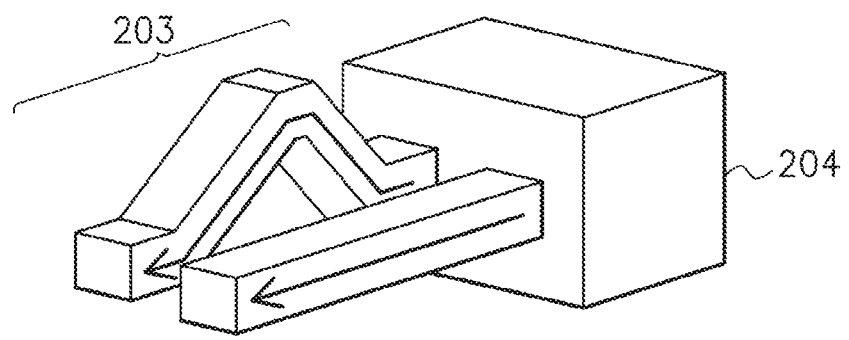
FIG. 8 is a view illustrating a configuration example of a phase shift circuit and an AC signal generator.

FIG. 8 is a view illustrating a configuration example of the phase shift circuit 203 and the AC signal generator 204. The phase shift circuit 203 retards the AC signal generated by the AC signal generator 204 to generate the plurality of AC signals mutually different in phase. More specifically, the phase shift circuit 203 has paths (waveguides) for the AC signals from the AC signal generator 204 to the plurality of electrodes 202 varied in length to adjust the retardation time to thereby generate the AC signals mutually different in phase by 30°.

Figure 9:
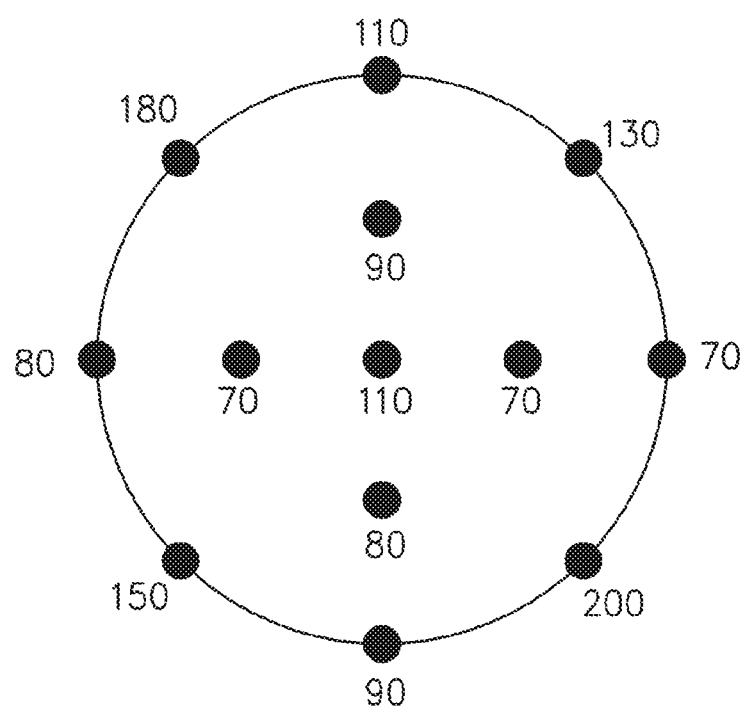
FIG. 9 is a view illustrating a temperature distribution in a filter when the filter is heated by irradiation with a microwave of 400 W for 3 minutes as in Patent Documents 1 and 2.

FIG. 9 is a view illustrating a temperature distribution in a filter when the filter is heated by irradiation with a microwave of 400 W for 3 minutes as in the above Patent Documents 1 and 2. It is found that the temperature distribution in the filter is nonuniform in the case of the irradiation with the microwave. The particulate matter in a region at high temperature are removed, whereas the particulate matter in a region at low temperature are not removed. Further, a region at ultra-high temperature of the filter may melt.

FIG. 10 is a view illustrating a temperature distribution in the filter 103 according to this embodiment in FIG. 4 to FIG. 6. It is found that the temperature distribution in the filter 103 is uniform in the case of this embodiment. According to this embodiment, heat is uniformly generated in the filter 103 and can uniformly remove the particulate matter in the filter 103. Further, this embodiment is high in safety because of no use of a microwave. For example, it is only necessary to perform cleaning of the filter 103 once a day (10 minutes to 20 minutes) by the above-described method.

Second Embodiment

FIG. 11 is a diagram illustrating a configuration example of an exhaust purification device 105 according to a second embodiment. This embodiment (FIG. 11) is the one obtained by adding a plurality of inductors 1101 to the first embodiment (FIG. 2). Hereinafter, points of this embodiment different from the first embodiment will be described. The plurality of inductors 1101 are connected between a plurality of electrodes 202 and a reference potential node (ground potential node), respectively. Further, between the plurality of electrodes 202, parasitic capacitances are formed. The parasitic capacitances between the plurality of electrodes 202 and the plurality of inductors 1101 constitute an oscillation circuit which oscillates.

Third Embodiment

Figure 12:
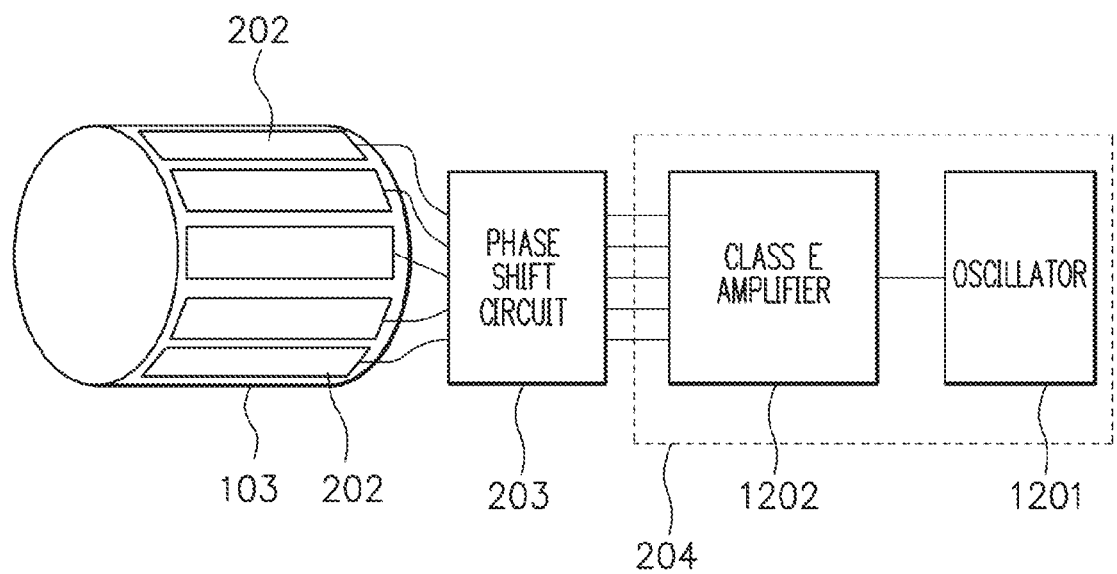
FIG. 12 is a diagram illustrating a configuration example of an exhaust purification device according to a third embodiment.

FIG. 12 is a diagram illustrating a configuration example of an exhaust purification device 105 according to a third embodiment. Hereinafter, points of this embodiment (FIG. 12) different from the first embodiment (FIG. 2) will be described. An AC signal generator 204 includes an oscillator 1201 and a class E amplifier 1202. The oscillator 1201 generates an AC signal. The class E amplifier 1202 is an amplifier circuit that is driven by a switching circuit in timing with the oscillator 1201 to perform power amplification. The class E amplifier 1202 amplifies the AC signal generated by the oscillator 1201 and outputs the amplified AC signal to the phase shift circuit 203.

Figure 13:
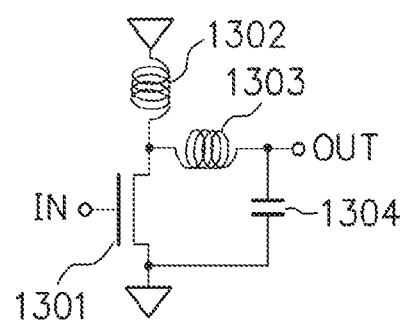
FIG. 13 is a circuit diagram illustrating a configuration example of a class E amplifier.

FIG. 13 is a circuit diagram illustrating a configuration example of the class E amplifier 1202 in FIG. 12. The class E amplifier 1202 includes a field-effect transistor 1301, inductors 1302, 1303, and a capacitance 1304. The field-effect transistor 1301 has a gate connected to an input node IN and a source connected to a reference potential node. The inductor 1302 is connected between a drain of the field-effect transistor 1301 and a power supply potential node. The inductor 1303 is connected between the drain of the field-effect transistor 1301 and an output node OUT. The capacitance 1304 is connected between the output node OUT and the reference potential node. The class E amplifier 1202 drives the field-effect transistor 1301 in timing with the oscillator 1201 to thereby amplify a signal from the input node IN and outputs the amplified signal from the output node OUT.

Fourth Embodiment

Figure 14:
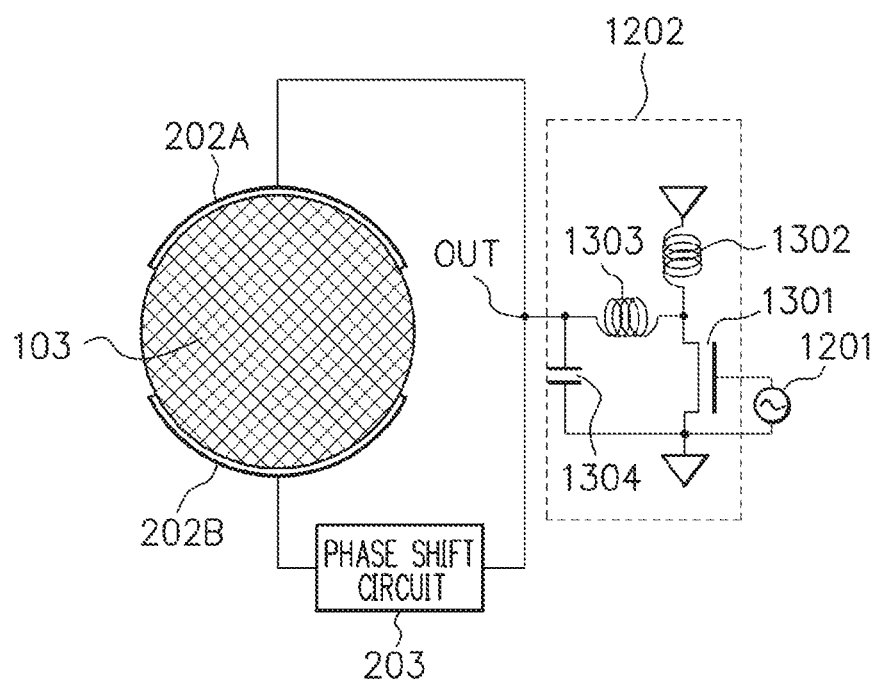
FIG. 14 is a diagram illustrating a configuration example of an exhaust purification device according to a fourth embodiment.

FIG. 14 is a diagram illustrating a configuration example of an exhaust purification device 105 according to a fourth embodiment. Hereinafter, points of this embodiment (FIG. 14) different from the third embodiment (FIG. 12 and FIG. 13) will be described. An oscillator 1201 and a class E amplifier 1202 are the same as the oscillator 1201 and the class E amplifier 1202 in FIG. 12 and FIG. 13. Two electrodes 202A and 202B are provided around a filter 103. An output node OUT of the class E amplifier 1202 is connected to the electrode 202A. A phase shift circuit 203 retards a signal from the output node OUT of the class E amplifier 1202, and outputs the retarded signal to the electrode 202B. To the electrodes 202A and 202B, AC signals mutually shifted in phase by 180° are applied. To the electrode 202A, an AC signal of Vo×sin ωt is applied. To the electrode 202B, an AC signal of Vo×sin (ωt+180°) is applied. A power supply 104 only needs to apply at least two AC signals mutually same in frequency and mutually different in phase to the plurality of electrodes 202A and 202B.

In this embodiment, as in the first embodiment, the electric fields occurring in the filter 103 change at high frequency, so that heat is uniformly generated in the filter 103 and can uniformly remove the particulate matter in the filter 103.

Fifth Embodiment

FIG. 15 is a diagram illustrating a configuration example of an exhaust purification device 105 according to a fifth embodiment. Hereinafter, points of this embodiment (FIG. 15) different from the fourth embodiment (FIG. 14) will be described. A class E amplifier 1202 includes a variable DC power supply 1501. The variable DC power supply 1501 outputs a DC voltage. An inductor 1302 is connected between the variable DC power supply 1501 and a drain of a field-effect transistor 1301. A temperature detector 201 corresponds to the temperature detector 201 in FIG. 2 and detects the temperature of a filter 103. A control circuit 205 corresponds to the control circuit 205 in FIG. 2 and controls the voltage of the variable DC power supply 1501 according to the temperature detected by the temperature detector 201 to thereby control an amplitude Vo of an AC signal to be applied to electrodes 202A and 202B.

More specifically, when a temperature T of the filter 103 is higher than 500° C., the control circuit 205 controls the voltage of the variable DC power supply 1501 to 0 [V]. Besides, when the temperature T of the filter 103 is lower than 100° C., the control circuit 205 controls the voltage of the variable DC power supply 1501 to 50 [V]. Besides, when the temperature T of the filter 103 is 100° C. or higher and 500° C. or lower, the control circuit 205 controls the voltage of the variable DC power supply 1501 to (500−T)/8 [V].

The control circuit 205 can perform control so that the filter 103 is kept at an appropriate temperature for incinerating the particulate matter. This makes it possible to prevent the particulate matter from remaining due to the filter 103 being excessively lowered in temperature. It is also possible to prevent burnout of the filter 103 due to the filter 103 being excessively raised in temperature.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

Application of at least two AC signals mutually different in phase makes it possible to make the temperature distribution in a filter uniform to thereby uniformly remove a particulate matter in the filter.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An exhaust purification device comprising:
   an exhaust pipe configured to discharge exhaust gas from an internal combustion engine;
   a filter provided in the exhaust pipe and configured to collect a particulate matter contained in the exhaust gas;
   a plurality of electrodes configured to apply electric fields to a plurality of regions of the filter, respectively; and
   a power supply configured to apply at least two AC signals mutually different in phase to the plurality of electrodes,
   wherein an interval between the plurality of electrodes is smaller than an interval between each of the plurality of electrodes and the exhaust pipe.

2. An exhaust purification device comprising:
   an exhaust pipe configured to discharge exhaust gas from an internal combustion engine;
   a filter provided in the exhaust pipe and configured to collect a particulate matter contained in the exhaust gas;
   a plurality of electrodes configured to apply electric fields to a plurality of regions of the filter, respectively;
   a power supply configured to apply at least two AC signals mutually different in phase to the plurality of electrodes; and
   a plurality of inductors connected to the plurality of electrodes, respectively,
   wherein the power supply comprises:
   an AC signal generator configured to generate an AC signal; and
   a phase shift circuit configured to retard the AC signal to generate the at least two AC signals mutually different n phase, and
   wherein capacitances between the plurality of electrodes and the plurality of inductors constitute an oscillation circuit.

3. The exhaust purification device according to claim 1 further comprising:
   a temperature detector configured to detect a temperature of the filter, wherein
   the power supply controls an amplitude of the at least two AC signals according to the temperature detected by the temperature detector.

4. The exhaust purification device according to claim 1 wherein
the power supply applies the at least two AC signals mutually same in frequency to the plurality of electrodes.

5. The exhaust purification device according to claim 1 wherein
the power supply applies the at least two AC signals at 200 MHz to 10 GHz to the plurality of electrodes.

6. A vehicle comprising an exhaust purification device, wherein
the exhaust purification device comprises:
an exhaust pipe configured to discharge exhaust gas from an internal combustion engine;
a filter provided in the exhaust pipe and configured to collect a particulate matter contained in the exhaust gas;
a plurality of electrodes configured to apply electric fields to a plurality of regions of the filter, respectively; and
a power supply configured to apply at least two AC signals mutually different in phase to the plurality of electrodes,
wherein an interval between the plurality of electrodes is smaller than an interval between each of the plurality of electrodes and the exhaust pipe.

* * * * *